United States Patent
Veness

(10) Patent No.: US 10,609,899 B2
(45) Date of Patent: Apr. 7, 2020

(54) BAFFLE FOR AN ANIMAL FEEDING DEVICE

(71) Applicant: Doskocil Manufacturing Company, Inc., Arlington, TX (US)

(72) Inventor: David Veness, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 319 days.

(21) Appl. No.: 15/656,597

(22) Filed: Jul. 21, 2017

(65) Prior Publication Data
US 2018/0027763 A1     Feb. 1, 2018

Related U.S. Application Data

(60) Provisional application No. 62/368,492, filed on Jul. 29, 2016.

(51) Int. Cl.
*A01K 5/01*     (2006.01)
*A01K 5/02*     (2006.01)

(52) U.S. Cl.
CPC .......... *A01K 5/0114* (2013.01); *A01K 5/0225* (2013.01)

(58) Field of Classification Search
CPC ... A01K 5/0275; A01K 5/0114; A01K 5/0225
See application file for complete search history.

(56) References Cited

U.S. PATENT DOCUMENTS

| | | | | |
|---|---|---|---|---|
| 347,398 A | * | 8/1886 | Towns | B01F 13/002 366/130 |
| 1,398,063 A | * | 11/1921 | Brown | F02M 1/00 48/189.4 |
| 1,605,401 A | * | 11/1926 | Hamilton | F02M 1/00 48/189.4 |
| 1,878,924 A | * | 9/1932 | Will | A45D 33/003 366/130 |
| 1,989,019 A | * | 1/1935 | O'Keeffe | B01F 11/0002 366/130 |
| 2,473,660 A | * | 6/1949 | Parmann | H01H 35/34 138/40 |
| 2,671,395 A | * | 3/1954 | Demuth | F24F 13/062 454/302 |

(Continued)

FOREIGN PATENT DOCUMENTS

| | | | | |
|---|---|---|---|---|
| FR | 2670989 A1 | * | 7/1992 | ........... A01K 5/0233 |
| GB | 2034675 A | | 6/1980 | |
| WO | 8807661 A1 | | 10/1988 | |

OTHER PUBLICATIONS

Extended European Search Report dated Dec. 18, 2017 in corresponding European Patent Application No. 17183662.

*Primary Examiner* — Magdalena Topolski
*Assistant Examiner* — Morgan T Barlow
(74) *Attorney, Agent, or Firm* — Global IP Counselors, LLP

(57) ABSTRACT

An animal feeding device including a hopper, a feeding base, and a baffle plate with an upwardly facing surface having an opening therein, an upwardly extending wall, and at least one projection extending in a direction opposite the upwardly extending wall. The baffle plate is included in an animal feeding device to enable food to pass through the opening, and support at least a portion of food in the animal feeder on the upwardly facing surface.

13 Claims, 5 Drawing Sheets

(56) References Cited

U.S. PATENT DOCUMENTS

| | | | | |
|---|---|---|---|---|
| 2,965,274 | A * | 12/1960 | Brillis | B01F 11/0002 |
| | | | | 229/400 |
| 2,969,769 | A * | 1/1961 | Paschall | A01K 5/0275 |
| | | | | 119/56.1 |
| 3,204,832 | A | 9/1965 | Morgan | |
| 3,742,913 | A * | 7/1973 | Crippen | A01K 5/0275 |
| | | | | 119/51.11 |
| 4,437,435 | A * | 3/1984 | Schule | A01K 5/0291 |
| | | | | 119/51.13 |
| 4,676,655 | A * | 6/1987 | Handler | B01F 11/0054 |
| | | | | 222/129 |
| 4,823,738 | A * | 4/1989 | Gold | A01K 5/0114 |
| | | | | 119/51.01 |
| 5,114,240 | A * | 5/1992 | Kindt-Larsen | A61B 17/8816 |
| | | | | 366/129 |
| 5,219,006 | A * | 6/1993 | Bishop | A47J 19/005 |
| | | | | 141/1 |
| 5,333,572 | A * | 8/1994 | Nutt | A01K 5/02 |
| | | | | 119/57.91 |
| 5,461,932 | A * | 10/1995 | Hall | G01F 1/363 |
| | | | | 138/40 |
| 5,547,275 | A * | 8/1996 | Lillelund | A47J 43/27 |
| | | | | 366/130 |
| 5,575,848 | A * | 11/1996 | Chedville | A47J 43/04 |
| | | | | 118/13 |
| 5,901,886 | A * | 5/1999 | Grindstaff | A01K 5/0275 |
| | | | | 222/156 |
| 6,325,532 | B1 * | 12/2001 | King | B01F 7/00241 |
| | | | | 366/129 |
| 6,691,640 | B1 | 2/2004 | Huckabee | |
| 7,198,004 | B1 * | 4/2007 | Lush | A01K 39/012 |
| | | | | 119/52.2 |
| 8,033,420 | B2 * | 10/2011 | Roseblade | A47G 19/2211 |
| | | | | 220/369 |
| 8,074,602 | B2 * | 12/2011 | Laliberte | A01K 5/0275 |
| | | | | 119/57.92 |
| 8,172,452 | B2 * | 5/2012 | Bacon | B65D 51/32 |
| | | | | 366/130 |
| 8,230,808 | B2 * | 7/2012 | Lai | A01K 5/0225 |
| | | | | 119/51.01 |
| 8,376,608 | B2 * | 2/2013 | Zimmerman | A47J 36/165 |
| | | | | 366/144 |
| 9,414,568 | B2 * | 8/2016 | Veness | A01K 5/0114 |
| 2006/0000418 | A1 * | 1/2006 | Kubala | A01K 5/0114 |
| | | | | 119/53 |
| 2006/0185606 | A1 * | 8/2006 | Park | A01K 5/0114 |
| | | | | 119/51.12 |
| 2006/0196433 | A1 * | 9/2006 | Ness | A01K 5/0114 |
| | | | | 119/52.1 |
| 2006/0278289 | A1 * | 12/2006 | Robinson | E03F 1/00 |
| | | | | 138/40 |
| 2010/0012041 | A1 * | 1/2010 | Wechsler | A01K 39/012 |
| | | | | 119/52.4 |
| 2015/0159799 | A1 * | 6/2015 | Taneya | F16L 37/091 |
| | | | | 138/40 |
| 2015/0190766 | A1 * | 7/2015 | Garner | B01F 5/0451 |
| | | | | 366/336 |
| 2017/0105388 | A1 * | 4/2017 | Pfeiff | A01K 5/02 |
| 2018/0368358 | A1 * | 12/2018 | Morin | A01K 5/0114 |

* cited by examiner

BAFFLE FOR AN ANIMAL FEEDING DEVICE

CROSS-REFERENCE TO RELATED APPLICATION

This application claims priority to U.S. Provisional Application No. 62/368,492, filed Jul. 29, 2016, the contents of which are hereby incorporated herein by reference.

BACKGROUND

Field of Invention

The present invention relates to a baffle for an animal feeding device. The invention relates particularly to a baffle that is inserted into an animal feeding device to reduce weight on the paddles of the feeding device and improve operation of the feeding device.

Background to the Invention

Animal feeding devices typically contain large inverted food storage containers that gravity feed pet food into a base portion having a food bowl. By using these devices, pet owners have the convenience of feeding their pets less frequently as the food dispensing function is performed automatically and pet owners can be away from their pets for longer periods of time.

Such animal feeding devices typically utilize a ramp disposed between the inverted food storage container and the food bowl to assist the food flowing from the food storage container into the bowl. In animal feeding devices that are molded from plastic, the ramp is typically integrally molded with the bowl and base that supports the storage container. However, in the event that plastic material is not utilized for the animal feeding device and, for example, stainless steel is utilized, the fabrication of an integral ramp is difficult as well as being costly to the manufacturing process.

Some animal feeding devices can be automatic pet feeding devices. These automatic devices can be programmable feeding systems. Such devices can be a convenient way to control an animal's eating portions, by automatically dispensing pre-set portions of pet food, making feedings precise and easy. These devices can have a large screen that displays the current time, meals programmed, meal size and meals served. Many of these devices have a paddle system that accurately dispenses food portions.

SUMMARY

It has been determined that the weight of the food can damage the paddle of the automatic animal feeding devices and cause food jams, stopping the feeder from properly operating. A need exists for improved automatic animal feeding devices. Accordingly, the present invention is directed to a baffle for a pet feeding device includes an upwardly facing surface having an opening therein, an upwardly extending wall, and at least one projection extending in a direction opposite the upwardly extending wall. The baffle is configured to be disposed in an animal feeding device to enable food to pass through the opening, and support at least a portion of food in the animal feeding device on the upwardly facing surface.

In another embodiment, a baffle for an animal feeding device includes an upwardly facing surface having an opening therein, and at least one projection extending in a direction opposite the upwardly extending wall. The baffle is configured to be disposed in an animal feeding device to enable food to pass through the opening, and support at least a portion of food in the animal feeder on the upwardly facing surface.

BRIEF DESCRIPTION OF THE DRAWINGS

The Figures illustrate an embodiment of a baffle for an animal feeding device.

DETAILED DESCRIPTION OF THE EMBODIMENTS

Figure 1:
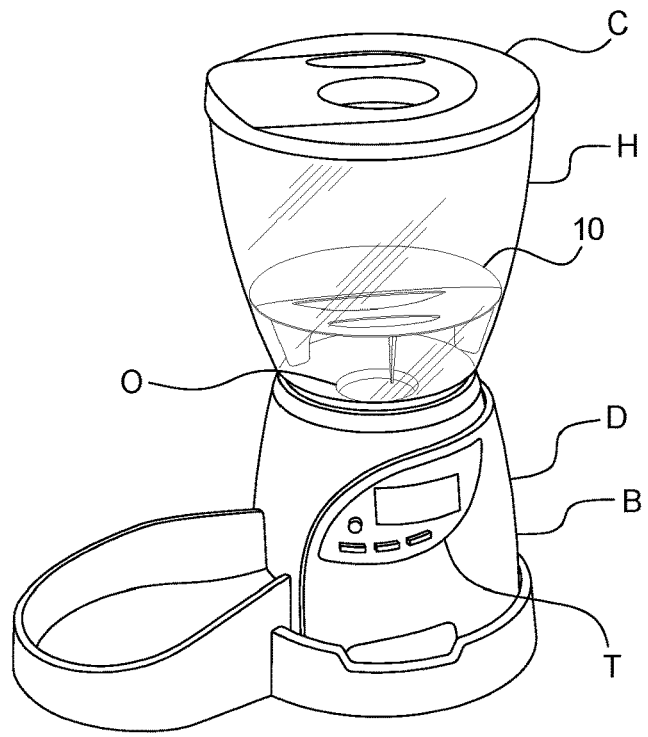
FIG. 1 is a top rear perspective view of the baffle according to one embodiment of the present invention disposed within an animal feeding device.
Figure 2:
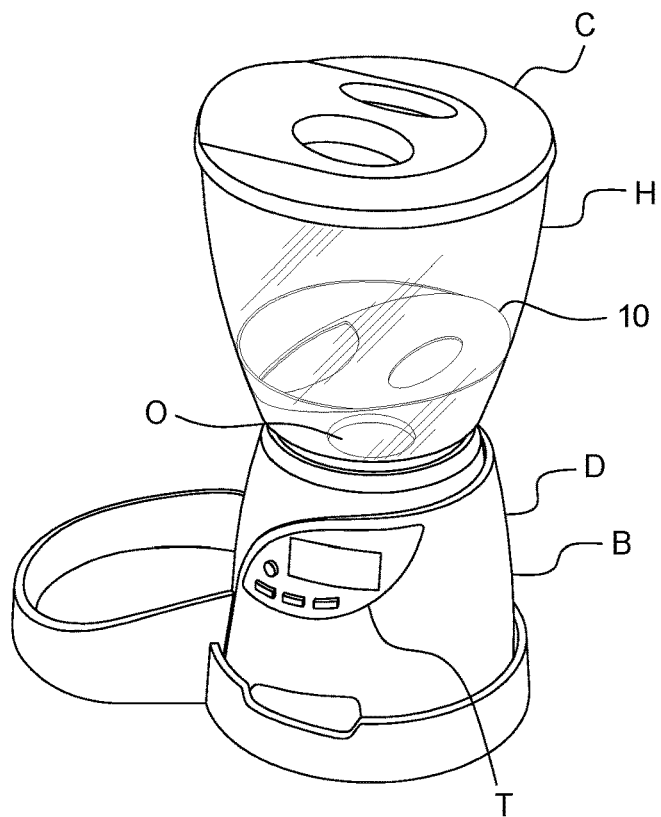
FIG. 2 is a top front perspective view of the baffle of claim 1 disposed within an animal feeding device.
Figure 3:
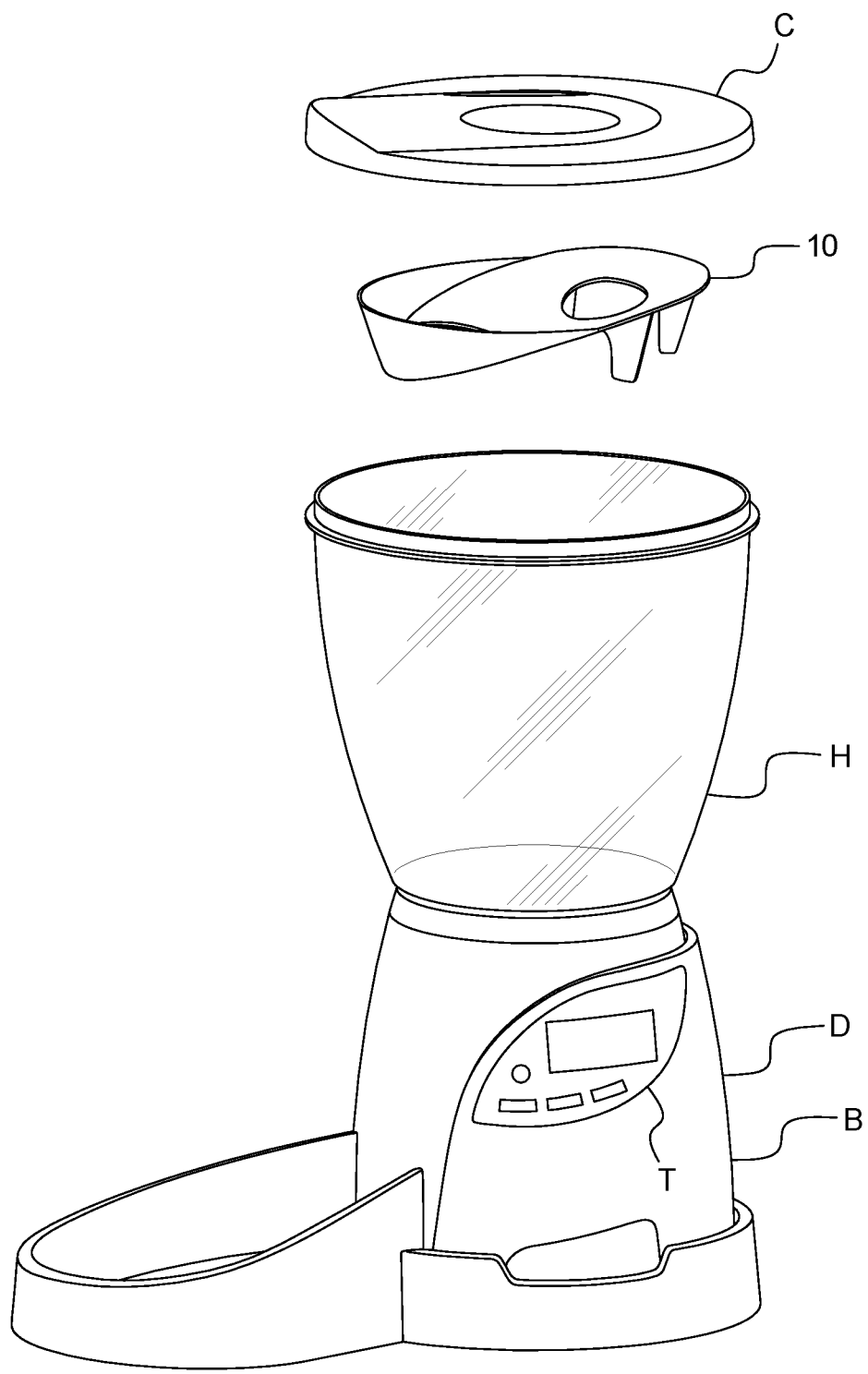
FIG. 3 illustrates an exploded perspective view of the embodiment shown in FIGS. 1 and 2.
Figure 4:
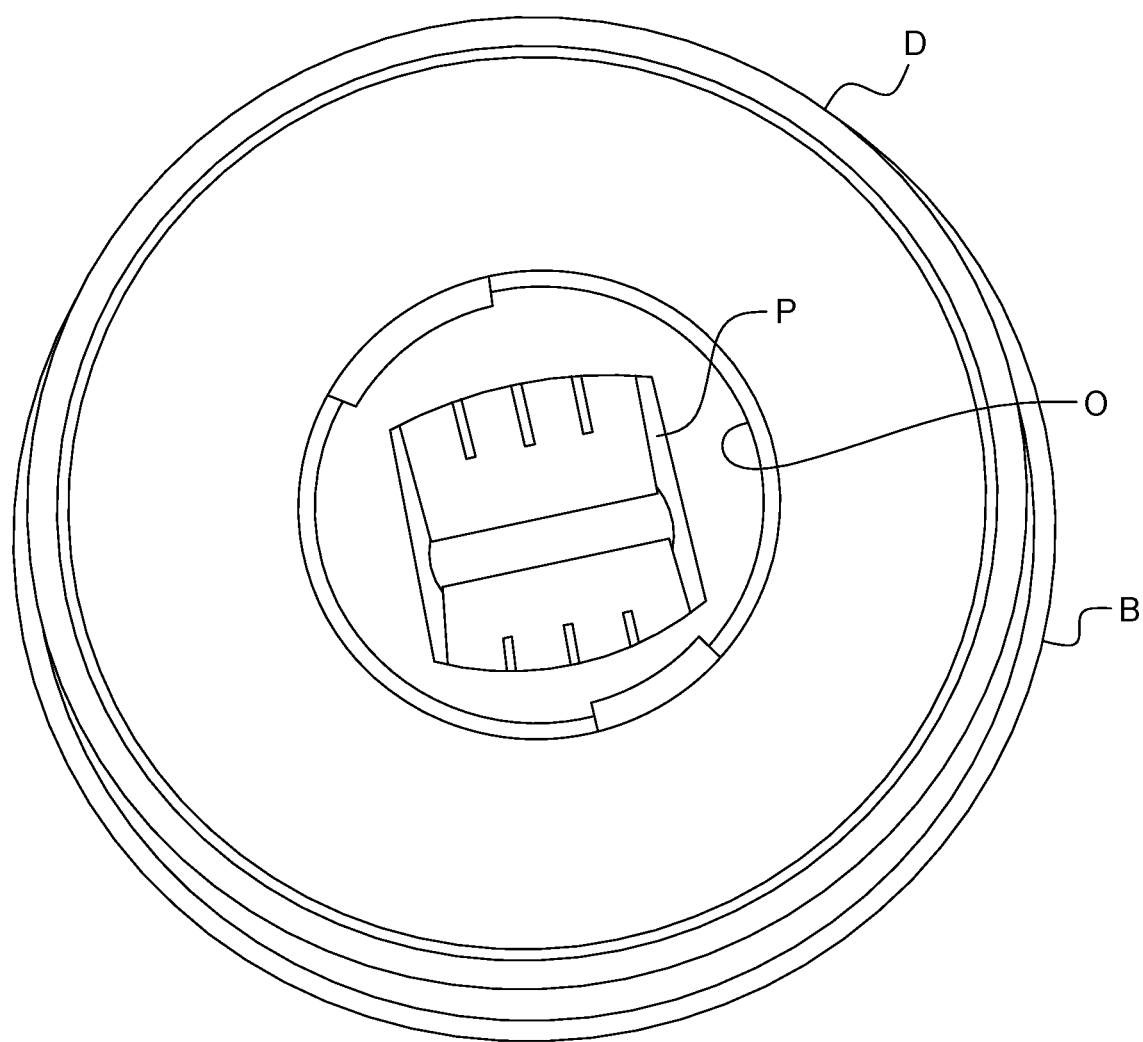
FIG. 4 shows a top view of the paddles of an automatic animal feeding device.
Figure 5:
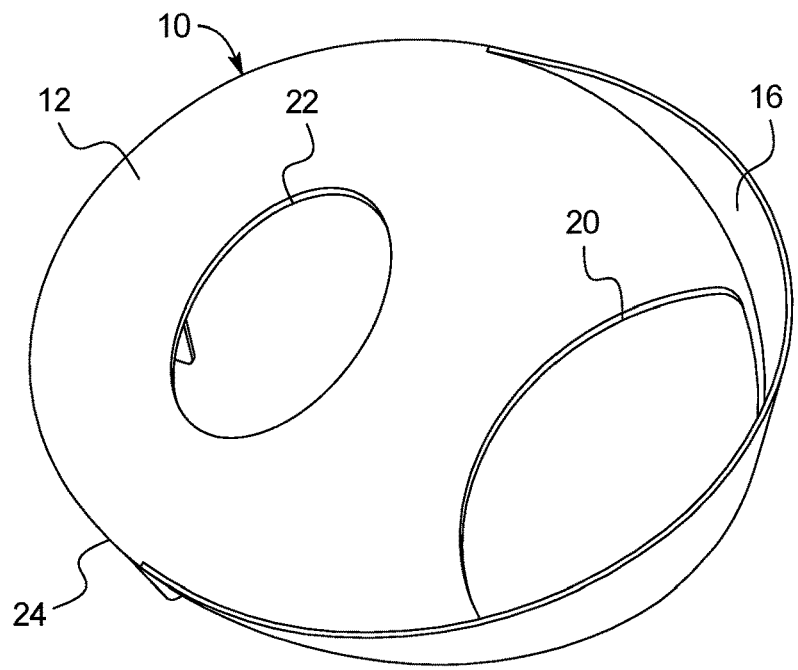
FIG. 5 is a top perspective view of the baffle according to one embodiment of the present invention.
Figure 6:
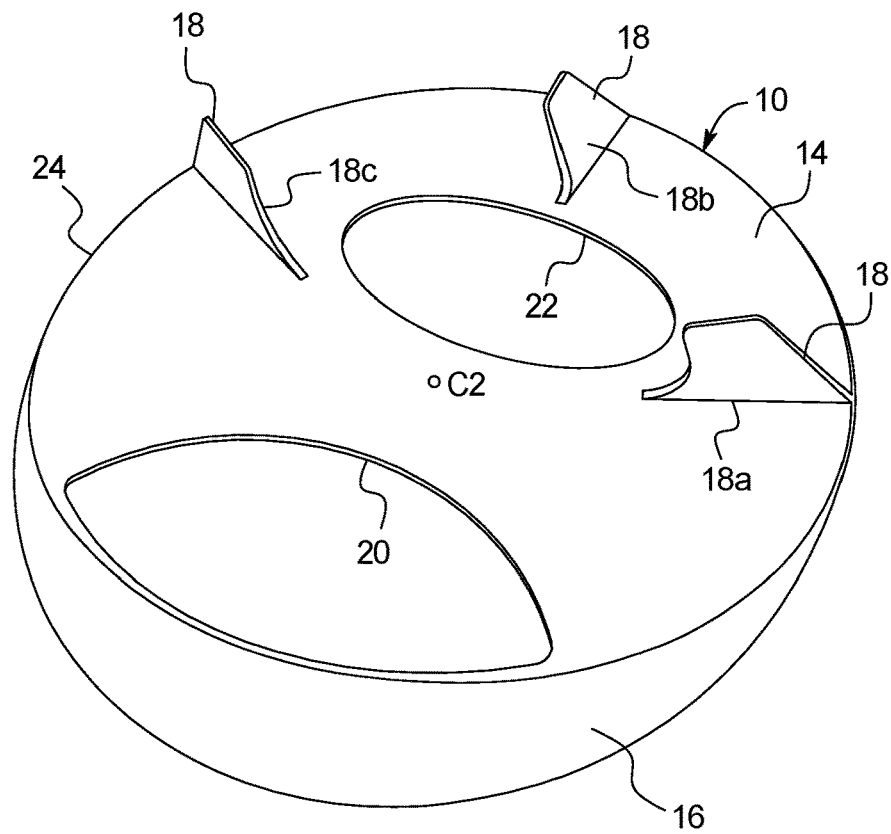
FIG. 6 is a bottom perspective view of the baffle of FIG. 5.

As shown in the Figures, the present invention is directed to a baffle 10 for an animal feeding device D. The animal feeding device D includes a base B, a hopper H and a cap C. The baffle 10 can be inserted into the hopper H, as shown in FIGS. 1-3. As one of ordinary skill in the art would understand some animal feeding device Ds have paddles P (FIG. 4) that restrict movement through the opening O of the food from the hopper H to the food holder in the base B. The paddles P can be automatically driven by a motor (not shown) with an electronic timer T to feed the animal at predetermined intervals. That is, there are generally a plurality of paddles P that rotate around a central axis. As the paddles P rotate a predetermined amount of food is dispensed. However, it is been found that the weight of the food can damage the paddles P and cause food jams stopping the feeder from properly operating. The baffle 10 of the present invention reduces weight on the paddles P and improves operation of the feeder.

As shown in FIGS. 5-8, one embodiment of the baffle 10 is generally circular, but can have any exterior shape that would enable the baffle 10 to fit in the hopper H. That is, the baffle 10 can have a shape that corresponds to the interior shape of the hopper H. In one embodiment, the baffle 10 is a plastic molded device; however, the baffle 10 can be formed from any suitable material.

The baffle 10 can have a generally circular (or any other suitable shape) upwardly facing surface 12, a generally circular (or any other suitable shape) downwardly facing surface 14, an upwardly extending wall 16, and downwardly extending projections 18. The upwardly facing surface 12 has first and second openings 20 and 22 that enable food or other material to pass therethrough. However, the openings are preferably generally less than 50% of the surface area of the upwardly facing surface 12. However, it is noted that the openings 20 and 22 can be more than 50% of the upwardly facing surface 12 of any other suitable percentage. The first and second openings 20 and 22 can have a generally elliptical configuration; however, the openings can have any suitable configuration.

The first opening 20 is offset from the baffle center C1 and is adjacent the outer circumference 24 of the baffle 10 and the upwardly extending wall 16. The second opening 22 is offset from the center C1 of the baffle 10. However, the center 26 and 28 of the first and second openings 20 and 22 are set such that a line L extends through the center C1 of the baffle 10 and each of the centers 26 and 28 of the openings 20 and 22. It is noted that there can be any number of openings in any suitable position.

The upwardly facing surface 12 can have a concave configuration, such that when the baffle 10 is inserted into the hopper H the opposite ends 30 and 32 of the baffle 10 extend in a slightly downward direction relative to the center of the baffle 10.

The downwardly facing surface 14 faces opposite the upwardly facing surface 12. That is, the downwardly facing surface 14 is on the opposite side of the baffle 10 relative to the upwardly facing surface 12. Accordingly, the first and second openings 20 and 22 extend from the upwardly facing surface 12 through the baffle 10 to the downwardly facing surface 14.

The upwardly extending wall 16 extends partly around the circumference 24 of the baffle 10, and extends upwardly from the upwardly facing surface 12. Preferably, the upwardly extending wall 16 is transverse (and more preferably substantially perpendicular) to the upwardly facing surface 12. The upwardly extending wall 16 has an arcuate configuration. That is, the upwardly extending wall 16 joins to the circumference of the baffle 10 at opposite sides of the baffle 10 and extends in an angle from the upwardly facing surface 12 to the upwardly extending highest point 34. The highest point 34 of the upwardly extending wall 16 can be at a position along the line L that extends through the center of the baffle 10 and each of the centers 26 and 28 of the openings 20 and 22. However, it is noted that the upwardly extending wall 16 can have any suitable configuration.

Figure 7:
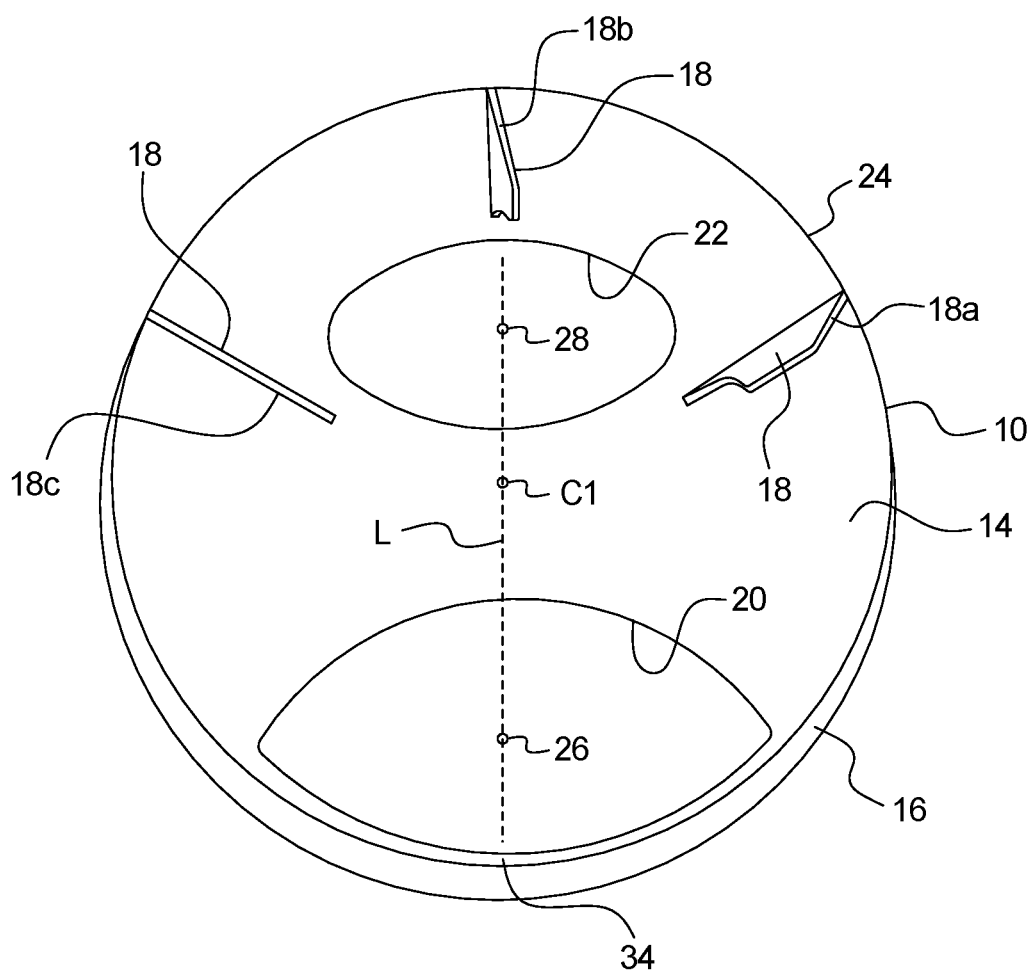
FIG. 7 is a bottom view of the baffle of FIG. 5.
Figure 8:
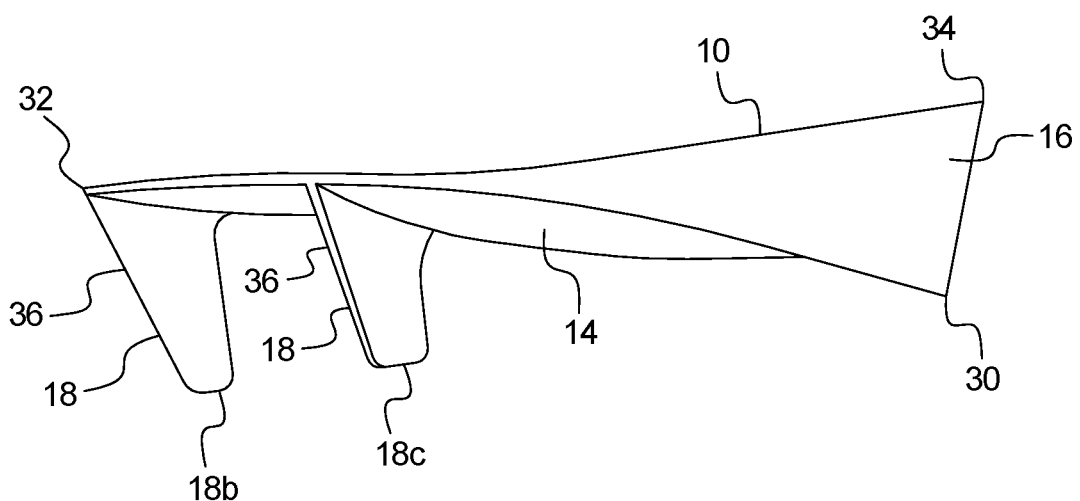
FIG. 8 is a side view of the baffle of FIG. 5.

The projections 18 extend downwardly from the downwardly facing surface 14. Preferably there are three projections 18a, 18b, 18c. Each of the projections 18 preferably has at least one surface 36 that extends inwardly from the circumference 24 of the baffle 10 (i.e., the circumferential outer portion of the downwardly facing surface 14) in a direction toward the center C2 (C2 is in substantially the same position as the center C1) of the downwardly facing surface 14. One of the projections (e.g., projection 18b) can be at a position along the line that extends through the center of the baffle 10 and each of the centers 26 and 28 of the openings 20 and 22, as shown in FIG. 7. In this position, the projection 18b is 180 degrees off set from the highest point of the upwardly extending wall 16. The projections 18a and 18c are disposed at predetermined angles relative to the projection 18b. For example, the projections 18a and 18c can be disposed at angles between 45 degrees and 90 degrees from the projection 18b. However, the projections 18 can disposed at any suitable position and number any suitable number.

Based on the structure of the baffle 10, the baffle 10 fits snuggly within the hopper H. As can be understood, the baffle 10 can have a diameter that enables the baffle 10 to be disposed at position between the top and the bottom of the hopper H. That is, the hopper H can have a decreasing diameter from the top to the bottom of the hopper H. The baffle 10 has a diameter and configuration that corresponds to a diameter of the hopper H that is closer to the bottom of the hopper H than the top of the hopper H, as shown in FIGS. 1 and 2. Accordingly, the baffle 10 configuration positions the baffle 10 at a corresponding diameter of the hopper H. However, the baffle 10 can be positioned in any suitable position within the hopper H.

Moreover, the baffle configuration enables the baffle 10 simply to be dropped into the hopper H. The upwardly extending wall 16 and protrusions 18 enable the baffle 10 to self-locate in a desirable position. As stated above, the baffle position causes a downward sloping angle of the upwardly facing surface 12 such that the first opening 20 is on the downward slope of the angle. This configuration enables improved operation of the baffle 10.

The overall configuration enables the upwardly and downwardly facing surfaces 12 and 14 of the baffle 10 to be disposed at an angle relative to the longitudinal or vertical direction of the hopper H. In particular, the side of the upwardly facing surface 12 adjacent the upwardly extending wall 16 is a lowest point and the side of the upwardly facing surface 12 adjacent the first projection is the highest point. Such a configuration enables the food or material to be gravity fed though the first and second openings.

Further, since the baffle 10 is disposed closer to the bottom of the hopper H a significant portion of the weight of the food or material is supported by the baffle 10. The baffle 10 enables an appropriate amount of food or material to pass through the openings to enable the animal to be properly fed. Thus, the paddles P are not required to overcome a significant weight to move. The baffle 10 of the present invention reduces weight on the paddles P and improves operation of the feeder.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Accordingly, these terms, as utilized to describe the present invention should be interpreted relative to a baffle for an animal feeder.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are

What is claims is:

1. An animal feeding device, comprising:
   a hopper;
   a feeding base; and
   a baffle plate comprising:
   an upwardly facing surface having at least one opening therethrough;
   an upwardly extending wall; and
   at least one projection extending from a surface opposite the upwardly facing surface;
   wherein the baffle plate is configured to be disposed in the animal feeding device to enable food to pass from the hopper to the feeding base through the at least one opening, the baffle plate is further configured to support at least a portion of food in the animal feeding device on the upwardly facing surface; and
   wherein the upwardly extending wall has a variable height, extending continuously in an arcuate configuration to a central highest point and extending partly around the circumference of the baffle plate.

2. The animal feeding device of claim 1, wherein the at least one opening comprises two openings.

3. The animal feeding device of claim 2, wherein each opening is less than 50 percent of the surface area of the upwardly facing surface.

4. The animal feeding device of claim 2, wherein a center of the first opening and a center of the second opening are set such that a line extends through the center of the baffle plate and each of the centers of the first and second openings.

5. The animal feeding device of claim 1, wherein each opening is offset from the center of the baffle plate and is adjacent to the outer circumference of the baffle plate and the upwardly extending wall.

6. The animal feeding device of claim 1, wherein the upwardly facing surface is concaved, such that when the baffle plate is inserted into the animal feeding device, opposite ends of the baffle plate extend in a slightly downward direction relative to a center of the baffle plate.

7. The animal feeding device of claim 1, wherein the at least one projection extends from a downwardly facing surface that is opposite the upwardly facing surface.

8. The animal feeding device of claim 7, wherein each projection includes a surface extending inwardly from a circumferential portion of the downwardly facing surface in a direction toward a center of the downwardly facing surface.

9. The animal feeding device of claim 1, wherein the upwardly extending wall is substantially perpendicular to the upwardly facing surface.

10. The animal feeding device of claim 1, wherein the upwardly extending wall extends at an angle from the upwardly facing surface.

11. The animal feeding device of claim 1, wherein the at least one projection is a plurality of projections.

12. The animal feeding device of claim 1, wherein at least one projection is disposed along a line that extends through a center of the baffle plate and a center of the at least one opening.

13. The animal feeding device of claim 12, wherein at least one projection is 180 degrees off set from a highest point of the upwardly extending wall.

* * * * *